United States Patent
Peng

(10) Patent No.: US 9,549,430 B2
(45) Date of Patent: Jan. 17, 2017

(54) COMMUNICATIONS SYSTEM, BASE STATION, USER EQUIPMENT, AND SIGNALING TRANSMISSION METHOD

(71) Applicant: Huawei Technologies Co., Ltd., Shenzhen (CN)

(72) Inventor: Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 14/573,805

(22) Filed: Dec. 17, 2014

(65) Prior Publication Data

US 2015/0103793 A1    Apr. 16, 2015

Related U.S. Application Data

(63) Continuation of application No. PCT/CN2012/077158, filed on Jun. 19, 2012.

(51) Int. Cl.
    *H04L 1/00*      (2006.01)
    *H04W 76/02*      (2009.01)
    *H04W 92/10*      (2009.01)

(52) U.S. Cl.
    CPC ........... *H04W 76/025* (2013.01); *H04W 92/10* (2013.01)

(58) Field of Classification Search
    CPC ...... H04W 72/04; H04W 72/05; H04W 72/06; H04W 80/04; H04W 80/05; H04W 80/06; H04W 80/07; H04W 80/08

(Continued)

(56) References Cited

U.S. PATENT DOCUMENTS

2008/0248804 A1   10/2008   Al-Bakri et al.
2011/0275359 A1   11/2011   Sebire et al.
(Continued)

FOREIGN PATENT DOCUMENTS

CN      1476266 A     2/2004
CN    101300857 A    11/2008
(Continued)

OTHER PUBLICATIONS

"$3^{rd}$ Generation Partnership Project; Technical Specification Group Radio Access Network; Evolved Universal Terrestrial Radio Access (E-UTRA); Relay architecture for E-UTRA (LTE-Advanced) (Release 9)," 3GPP TR 36.806, V9.0.0, pp. 1-34, $3^{rd}$ Generation Partnership Project, Valbonne, France (Mar. 2010).

*Primary Examiner* — Dady Chery
(74) *Attorney, Agent, or Firm* — Leydig, Voit & Mayer, Ltd.

(57) ABSTRACT

The present invention provides a communications system, a base station, a user equipment, and a signaling transmission method. The system includes: a first base station and a second base station. User data transmission exists between the first base station and a UE; the first base station performs control signaling interaction with the UE by using a first signaling radio bearer; and the second base station performs control signaling interaction with the UE by using an SRB0, an SRB1, or an SRB2, where the first signaling radio bearer is different from the SRB0, the SRB1, and the SRB2. The technical solutions of the present invention can solve a problem of configuring a radio resource of an air interface connection between an enhancement-layer base station and a UE.

20 Claims, 8 Drawing Sheets

(58) Field of Classification Search
USPC .................................................. 370/329–334
See application file for complete search history.

(56) References Cited

U.S. PATENT DOCUMENTS

2013/0010702 A1    1/2013  Aminaka
2014/0226576 A1*   8/2014  Gupta .................. H04W 56/00
                                                      370/329

FOREIGN PATENT DOCUMENTS

KR      20090038752 A    4/2009
WO      WO 2011125278 A1  10/2011

* cited by examiner

COMMUNICATIONS SYSTEM, BASE STATION, USER EQUIPMENT, AND SIGNALING TRANSMISSION METHOD

CROSS-REFERENCE TO RELATED APPLICATION

This application is a continuation of International Patent Application No. PCT/CN2012/077158, filed on Jun. 19, 2012, which is hereby incorporated by reference in its entirety.

TECHNICAL FIELD

The present invention relates to communications technologies, and in particular, to a communications system, a base station, a user equipment, and a signaling transmission method.

BACKGROUND

During the development of broadband and mobile networks, the 3rd generation partnership Project (3GPP) organization has proposed a Long Term Evolution (LTE) solution for a mobile access network, namely, an evolved universal terrestrial radio access network (E-UTRAN), and a system architecture evolution (SAE) solution for a mobile core network, namely, an evolved packet core network (Evolved Packet Core, EPC).

A single-layer structure formed only by an evolved NodeB (eNB) is used for the E-UTRAN, so as to simplify a network and reduce a delay. An interface between a user equipment (UE) and an eNB is a Uu interface, which is a radio interface connection. A user plane of the Uu interface is mainly used to transfer an internet protocol (IP) data packet, and mainly implements functions, such as header compression, encryption, scheduling, hybrid automatic repeat request (HARQ) and automatic repeat-request (ARQ). A signaling plane of the Uu interface is mainly used to transmit a signaling message. Control-plane signaling of the UE, for example, radio resource control (RRC) signaling, is mapped to a signaling radio bearer (SRB) for transmission; and all IP data packets on the user plane are mapped to different data radio bearers (DRB) for transmission. The SRB and the DRB first undergo packet data convergence protocol (PDCP) sublayer and a radio link control (RLC) sublayer processing, and then are reused at a media access control (MAC) sublayer. The DRB and the SRB of the UE use a same MAC entity, that is, a user plane and a control plane of a same UE are anchored on a same eNB.

In a case in which a macro cell and a pico cell overlap, for a UE with high mobility, if the UE is attached to a macro eNB with a large coverage area, factors affecting user experience, such as service interruption and throughput reduction that may be caused by frequent handovers, may be avoided; however, because the UE needs to be connected to a farther macro eNB, consumption of transmit power and an air interface resource needs to be increased. If the UE is attached to a nearer pico eNB, consumption of an air interface resource may be decreased, but the number of handover times and a handover failure rate are increased, which causes service interruption of the UE.

For the foregoing problems, an idea of separating a control plane and a user plane of an air interface is proposed in the prior art: A signaling base station (signalling BS) provides a control-plane connection of a UE, and a data base station (Data BS) provides a data-plane connection of the UE. In a process of implementing separation of a control plane and a user plane of an air interface, a problem that the data base station dynamically configures, according to a change of a radio channel between the UE and the data base station, a radio resource of an air interface connection between the UE and the data base station of the UE needs to be solved.

SUMMARY

The present invention provides a communications system, a base station, a user equipment, and a signaling transmission method, which are used to dynamically configure a radio resource of an air interface connection between the UE and a data base station of the UE in a timely and effective manner according to a change of a radio channel between the UE and the data base station.

One aspect of the present invention provides a communications system, and the communications system includes a first base station and a second base station; where user data transmission exists between the first base station and a user equipment UE, and the first base station performs control signaling interaction with the UE by using a first signaling radio bearer; and the second base station performs control signaling interaction with the UE by using a signaling radio bearer SRB0, a signaling radio bearer SRB1, or a signaling radio bearer SRB2; where the first signaling radio bearer is different from the SRB0, the SRB1, and the SRB2.

The one aspect of the present invention further provides a signaling transmission method, and the signaling transmission method includes:

performing, by a first base station, control signaling interaction with a user equipment UE by using a first signaling radio bearer, where user data transmission exists between the first base station and the UE; and performing, by a second base station, control signaling interaction with the UE by using a signaling radio bearer SRB0, a signaling radio bearer SRB1, or a signaling radio bearer SRB2; where the first signaling radio bearer is different from the SRB0, the SRB1, and the SRB2.

Another aspect of the present invention provides a base station, where user data transmission exists between the base station and a user equipment UE, and the base station performs control signaling interaction with the UE by using a first signaling radio bearer; where the first signaling radio bearer is different from a signaling radio bearer SRB0, a signaling radio bearer SRB1, and a signaling radio bearer SRB2; and any signaling radio bearer of the SRB0, SRB1, and SRB2 is a signaling radio bearer that is used when another base station different from the base station performs control signaling interaction with the UE.

The another aspect of the present invention further provides a signaling transmission method, and the signaling transmission method includes:

performing, by a base station, control signaling interaction with a user equipment UE by using a first signaling radio bearer; where user data transmission exists between the base station and the UE; the first signaling radio bearer is different from a signaling radio bearer SRB0, a signaling radio bearer SRB1, and a signaling radio bearer SRB2; and any signaling radio bearer of the SRB0, SRB1, and SRB2 is a signaling radio bearer that is used when another base station different from the base station performs control signaling interaction with the UE.

Still another aspect of the present invention provides a user equipment, wherein user data transmission exists between the UE and a base station, and the UE performs control signaling interaction with the base station by using a first signaling radio bearer; where the first signaling radio bearer is different from a signaling radio bearer SRB0, a signaling radio bearer SRB1, and a signaling radio bearer SRB2; and any signaling radio bearer of the SRB0, SRB1, and SRB2 is a signaling radio bearer that is used when another base station different from the base station performs control signaling interaction with the UE.

The still another aspect of the present invention further provides a signaling transmission method, and the signaling transmission method includes:

performing, by a user equipment UE, control signaling interaction with a base station by using a first signaling radio bearer; where user data transmission exists between the UE and the base station; the first signaling radio bearer is different from a signaling radio bearer SRB0, a signaling radio bearer SRB1, and a signaling radio bearer SRB2; and any signaling radio bearer of the SRB0, SRB1, and SRB2 is a signaling radio bearer that is used when another base station different from the base station performs control signaling interaction with the UE.

In a communications system and a signaling transmission method provided in one aspect of the present invention, a second base station performs control signaling interaction with a UE by using an SRB0, an SRB1, or an SRB2, for example, establishing, modifying, and releasing an RRC connection, or performing mobility management of the UE; however, a first base station that performs user data transmission with the UE performs control signaling interaction with the UE by using a first signaling radio bearer, so that the first base station and the UE may dynamically configure a radio resource of an air interface connection between the first base station and the UE in a timely and effective manner according to a change of a radio channel between the first base station and the UE.

In a base station and a signaling transmission method provided in another aspect of the present invention, user data transmission exists between the base station and a UE, and the base station performs control signaling interaction with the UE by using a first signaling radio bearer, while another base station different from the base station performs control signaling interaction with the UE by using an SRB0, an SRB1, or an SRB2. It can be seen that, because the first signaling radio bearer different from an existing signaling radio bearer exists between the base station and the UE, the base station may dynamically configure a radio resource of an air interface connection between the base station and the UE in a timely and effective manner according to a change of a radio channel between the base station and the UE, thereby solving a problem of configuring the radio resource of the air interface connection between the base station and the UE.

In a user equipment and a signaling transmission method provided in still another aspect of the present invention, the UE performs, by using a first signaling radio bearer, control signaling interaction with a base station that performs user data transmission with the UE, while performing s control signaling interaction with another base station different from the foregoing base station by using an SRB0, an SRB1, or an SRB2. It can be seen that, a first signaling radio bearer different from an existing signaling radio bearer exists between the UE and the base station that performs user data transmission with the UE, so that the UE may receive, in a timely manner from the base station that performs user data transmission with the UE, a radio resource that is of an air interface connection between the UE and the base station and is configured according to a change of a radio channel between the base station and the UE, thereby solving a problem of configuring the radio resource of the air interface connection between the UE and the base station that performs user data transmission with the UE.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
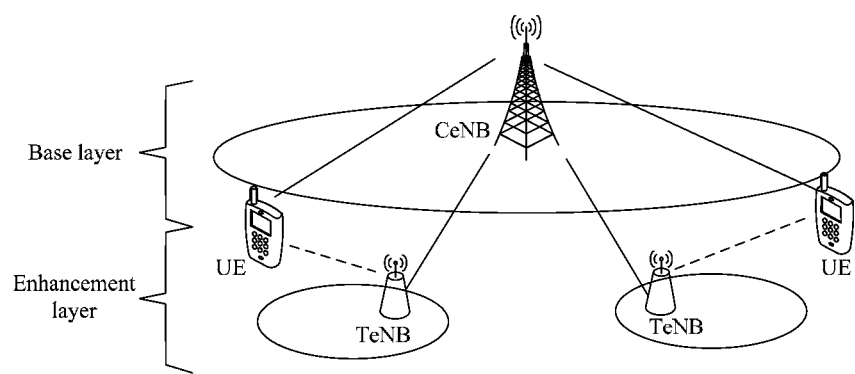
FIG. 1 is a schematic structural diagram of a communications network according to an embodiment of the present invention.

FIG. 1 is a schematic structural diagram of a communications network according to an embodiment of the present invention. As shown in FIG. 1, the communications network in this embodiment includes two layers: one is a base layer, used to provide basic seamless coverage, and the other one is an enhancement layer, used to provide a transmission of high-throughput in a hotspot area. For the base layer, coverage is provided by a base-layer base station, and for the enhancement layer, coverage is provided by an enhancement-layer base station. The base-layer base station is mainly responsible for basic coverage including control-plane signaling interaction of an air interface, and the enhancement-layer base station is mainly responsible for user-plane data interaction of the air interface.

The base-layer base station is generally a high-power node, and may be called a CeNB. The base layer of the communications network is generally covered by multiple CeNBs; once a CeNB is missing, a coverage hole occurs consequently. In addition, the base-layer base station may also be a low-power node in a case of blank area coverage. The base-layer base station generally transfers control-plane signaling by using a low frequency band, for example, an RRC connection of a UE is established on the base-layer base station. Optionally, the base-layer base station may also carry a part of low-data-volume services of a UE.

The enhancement-layer base station is generally a low-power node, and may be called a TeNB. The enhancement layer of the communications network is generally covered by multiple TeNBs. The enhancement-layer base station generally transfers a large amount of service data by using a high frequency band, for example, carrying large-data-volume services of a UE, for example, a File Transfer Protocol (FTP) or a video. There is no S1-MME interface between the enhancement-layer base station and a mobility management entity (MME), and information exchange between the enhancement-layer base station and the base-layer base station is performed through an SX interface.

For a UE, there is one base-layer base station; there may be one or more enhancement-layer base station, and may also be no enhancement-layer base station. As shown in FIG. 1, a solid line between a UE and a TeNB indicates a control-plane signaling connection, and a dashed line between a UE and a TeNB indicates a user-plane data connection.

The following embodiments of the present invention are applicable to a two-layer network structure shown in FIG. 1, and are also applicable to a scenario in which base stations overlap on a single-layer network. Whether in the two-layer network structure shown in FIG. 1 or the scenario in which base stations overlap on a single-layer network, at least two base stations exist, for example, a first base station and a second base station, where user data transmission exists between the first base station and a UE, and the first base station performs control signaling interaction with the UE by using a first signaling radio bearer; and the second base station mainly performs control signaling interaction with the UE by using a signaling radio bearer SRB0, a signaling radio bearer SRB1, or a signaling radio bearer SRB2. In the following embodiments of the present invention, the two-layer network structure shown in FIG. 1 is used as an example for description.

In the following embodiments of the present invention, the enhancement-layer base station has a function of providing user data transmission for a UE, and a function of performing control signaling interaction with the UE to configure a radio resource of an air interface connection between the enhancement-layer base station and the UE.

Figure 2A:
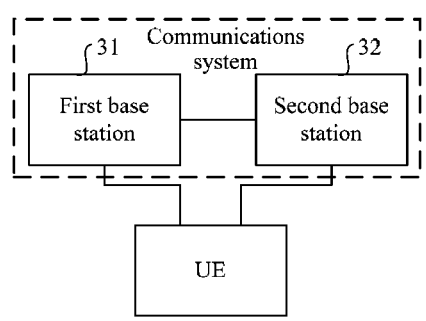
FIG. 2A is a schematic structural diagram of a communications system according to an embodiment of the present invention.

FIG. 2A is a schematic structural diagram of a communications system according to an embodiment of the present invention. As shown in FIG. 2A, the system in this embodiment includes: a first base station 31 and a second base station 32.

User data transmission exists between the first base station 31 and a UE, and the first base station 31 performs control signaling interaction with the UE by using a first signaling radio bearer; and the second base station 32 performs control signaling interaction with the UE by using a signaling radio bearer SRB0, a signaling radio bearer SRB1, or a signaling radio bearer SRB2.

The first signaling radio bearer is different from the SRB0, the SRB1, and the SRB2.

In this embodiment, the first base station 31 is an enhancement-layer base station and has all functions of the enhancement-layer base station, for example, including a DRB, where user data transmission with a UE may be performed by using the DRB. In addition, the first base station 31 in this embodiment may also have a function of performing control signaling interaction with the UE by using the first signaling radio bearer. The control signaling interaction herein is mainly used to configure a radio resource of an air interface connection between the first base station 31 and the UE. The first base station 31 does not include the SRB0, the SRB1, and the SRB2 of the UE.

In this embodiment, the second base station 32 is a base-layer base station and has all functions of the base-layer base station, for example, performing control signaling interaction with a UE, which includes establishing, modifying, and releasing an RRC connection, or performing mobility management of the UE. The second base station 32 in this embodiment includes the SRB0, the SRB1, and the SRB2 of the UE.

Optionally, the first signaling radio bearer is a newly added signaling radio bearer, for example, the first signaling radio bearer may be marked as an SRB3, to which it is not limited.

In the communications system provided in this embodiment, the first base station 31 performs control signaling interaction with the UE by using the first signaling radio bearer, so that the first base station 31 and the UE may dynamically configure a radio resource of an air interface connection between the first base station 31 and the UE in a timely and effective manner according to a change of a radio channel between the first base station 31 and the UE, thereby providing a condition for configuring the air interface connection between the first base station 31 and the UE.

In an optional implementation manner of this embodiment, an application that the first base station 31 performs control signaling interaction with the UE by using the first signaling radio bearer is specifically that: the first base station 31 performs control signaling interaction with the UE by using the first signaling radio bearer, so as to control the UE to configure the radio resource of the air interface connection between the UE and the first base station 31.

Based on the foregoing description, the first base station 31 may be specifically configured to configure the radio resource of the air interface connection between the first base station 31 and the UE; generate a configuration message, where the configuration message includes radio resource configuration of the air interface connection; send the configuration message to the UE by using the first signaling radio bearer, so that the UE configures the radio resource of the air interface connection according to the radio resource configuration of the air interface connection; and receive, by using the first signaling radio bearer, a configuration completion message sent by the UE. Correspondingly, the UE is specifically configured to receive, by using the first signaling radio bearer, the configuration message sent by the first base station 31, and configure the radio resource of the air interface connection according to the radio resource configuration of the air interface connection in the configuration message. Further, after configuring the radio resource of the air interface connection, the UE generates the configuration completion message and sends the configuration completion message to the first base station 31, so as to inform the first base station 31 that the UE has configured the radio resource of the air interface connection.

In an optional implementation manner of this embodiment, an application that the second base station 32 performs control signaling interaction with the UE by using the SRB1 is specifically that: the second base station 32 performs control signaling interaction with the UE by using the SRB1, so as to control the UE to add the foregoing first signaling radio bearer.

Based on the foregoing description, the second base station 32 is specifically configured to send an RRC message to the UE by using the SRB1, so that the UE adds the first signaling radio bearer, where the RRC message includes an identifier and configuration information of the first signaling radio bearer. Correspondingly, the UE receives the RRC message, adds the first signaling radio bearer according to the RRC message, and configures the first signaling radio bearer, thereby providing a condition for performing control signaling interaction between the UE and the first base station 31 by using the first signaling radio bearer. That is, the UE adds the first signaling radio bearer according to control of the second base station 32. The RRC message may be an RRC connection reconfiguration message, to which it is not limited. The configuration information included in the RRC message includes RLC configuration, a logical channel identifier, logical channel configuration, and the like.

It should be noted herein that, addition of the first signaling radio bearer is completed by the second base station 32 by sending the RRC message to the UE through the SRB1; however, modification to configuration of the first signaling radio bearer may be completed by the first base station 31 by sending the RRC message to the UE through the first signaling radio bearer. The RRC message herein may also be an RRC connection reconfiguration message, to which it is not limited.

In an optional implementation manner of this embodiment, the second base station 32 includes a DRB. Based on the foregoing description, the second base station 32 may further perform user data transmission with the UE by using the DRB.

In an optional implementation manner of this embodiment, the first base station 31 further performs data transmission with the UE by using the DRB. Specifically, the first base station 31 uses the radio resource that is of the air interface connection between the first base station 31 and the UE and configured by the first base station 31, to perform data transmission with the UE by using the DRB.

The first base station 31 and the second base station 32 are separately connected to the UE. Optionally, the first base station 31 is further connected to the second base station 32.

It should be noted herein that, the communications system in this embodiment may include multiple first base stations 31 and one second base station 32.

It can be seen from the foregoing that, in the communications system in this embodiment, the first base station is responsible for performing data transmission with the UE by using the DRB, and configuring the radio resource of the air interface connection between the first base station and the UE by using the first signaling radio bearer, thereby solving a problem of configuring the radio resource of the air interface connection between the first base station and the UE. The second base station is responsible for performing control signaling interaction with the UE, establishing, modifying, and releasing an RRC connection, performing UE mobility management, and the like, and controlling the UE to establish the first signaling radio bearer with the first base station. The second base station is not required for configuring the radio resource of the air interface connection between the first base station and the UE, and the first base station directly sends a configuration message to the UE by using the first signaling radio bearer, so that the UE configures the radio resource of the air interface connection between the UE and the first base station according to the configuration message, which reduces a delay in configuring the radio resource of the air interface connection between the UE and the first base station, and also helps to save an overhead of the second base station.

The following further describes the communications system provided in this embodiment, and the first base station and the second base station in the communications system.

The communications system in this embodiment may be divided into two layers, namely, a base layer and an enhancement layer. The base layer may be formed by the second base station 32 in the communications system, and the enhancement layer may be formed by the first base station 31 in the communications system. The second base station 32 is generally a high-power node, to which it is not limited. For example, the second base station 32 may also be a low-power node in a case of blank area coverage. Once a second base station 32 at the base layer is missing, a coverage hole occurs consequently.

The second base station 32 generally transfers control-plane signaling by using a low frequency band. An RRC connection of a UE is established on the second base station 32 of the base layer. The second base station 32 includes but is not limited to the following functions: system information broadcasting, RRC connection management, paging, RRC connection establishment/modification/release, measurement configuration and reporting ( ), handover activation and deactivation of the first base station 31 at the enhancement layer, selection of the first base station 31 at the enhancement layer for a service bearer of a UE, bearer management interaction with the first base station 31 at the enhancement layer, and the like.

Optionally, the second base station 32 may bear a part of low-data-volume service bearer of a UE, that is, the second base station 32 further includes a function of DRB data transmission.

The first base station 31 at the enhancement layer is generally a low-power node, and generally transfers a large amount of data to the UE by using a high frequency band, for example, an FTP or a video. The first base station 31 is transparent for an EPS node, and there is no S1-MME interface between the first base station 31 and an MME. The first base station 31 includes but is not limited to the following functions: bearer management interaction with the second base station 32 at the base layer, DRB data transmission with a UE according to configuration of the second base station 32 at the base layer, and configuration of an air interface connection between the first base station 31 and the UE, for example, DRB modification, MAC sublayer configuration (mac-MainConfig), PHY configuration (physical-ConfigDedicated), SPS configuration (sps-Config).

For a UE, the second base station 32 at the base layer and the first base station 31 at the enhancement layer are in a many-to-one relationship, that is, a UE has only one second base station 32, and may have one or more first base stations 31. Migration of the second base station 32 at the base layer inevitably causes migration of the first base station 31 at the enhancement layer.

In this embodiment, no matter for the first base station 31 or the second base station 32, protocol stacks of the first base station 31 or the second base station 32 from top to bottom includes: an RRC layer/IP layer, a PDCP layer, an RLC layer, a MAC layer, and a physical layer. The PDCP layer mainly implements a function of encryption and integrity protection, and may use, for example, robust header compression (ROHC) or a security technology. The RLC layer mainly provides a segmentation and retransmission service for user data and control data, and uses a technology, such as segmentation (Segm), or an automatic repeat-request (ARQ). The MAC layer mainly implements functions, such as scheduling, priority handling, multiplexing of a UE, and hybrid automatic repeat request (HARQ).

Figure 2B:
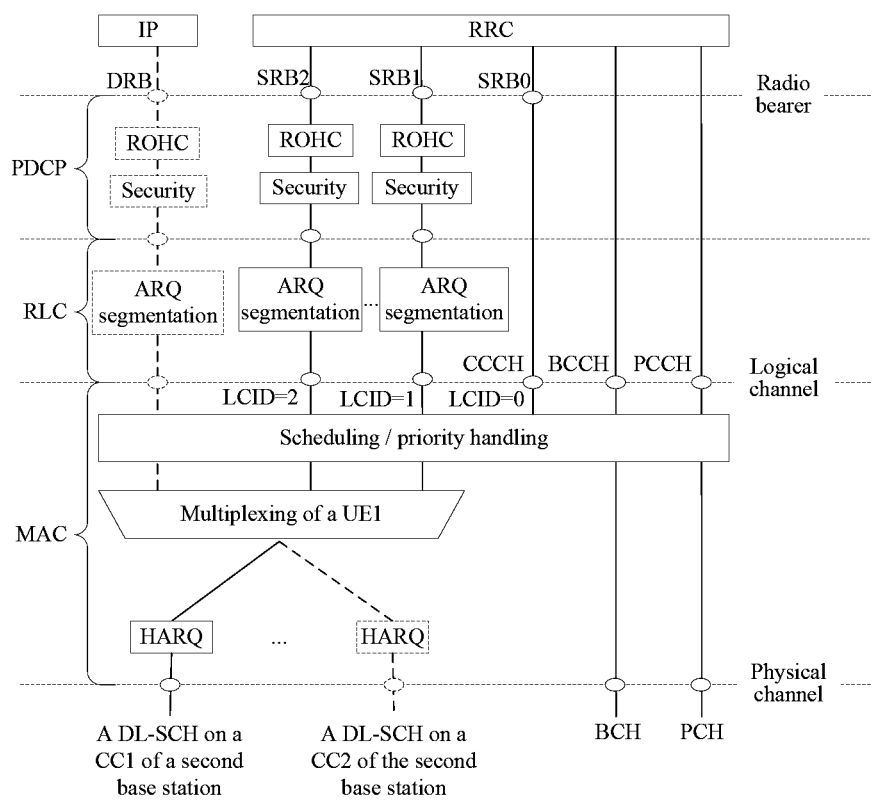
FIG. 2B is a schematic diagram of downlink mapping logic of a second base station according to an embodiment of the present invention.

Downlink mapping logic of the second base station 32 is shown in FIG. 2B. The second base station 32 has completion RRC functions and related channels on the downlink, for example, including an SRB0, an SRB1, an SRB2, a broadcast channel, and a paging channel, which are the same as an RRC function in the prior art, and details are not repeatedly described herein. The second base station 32 may also have a DRB, where the DRB is mainly used to transmit small-data-volume user data. Downlink mapping logic of the second base station 32 is basically consistent with downlink mapping logic of a base station in a current LTE system, except that a DRB is optional (the part shown by a dashed line in FIG. 2B).

Figure 2C:
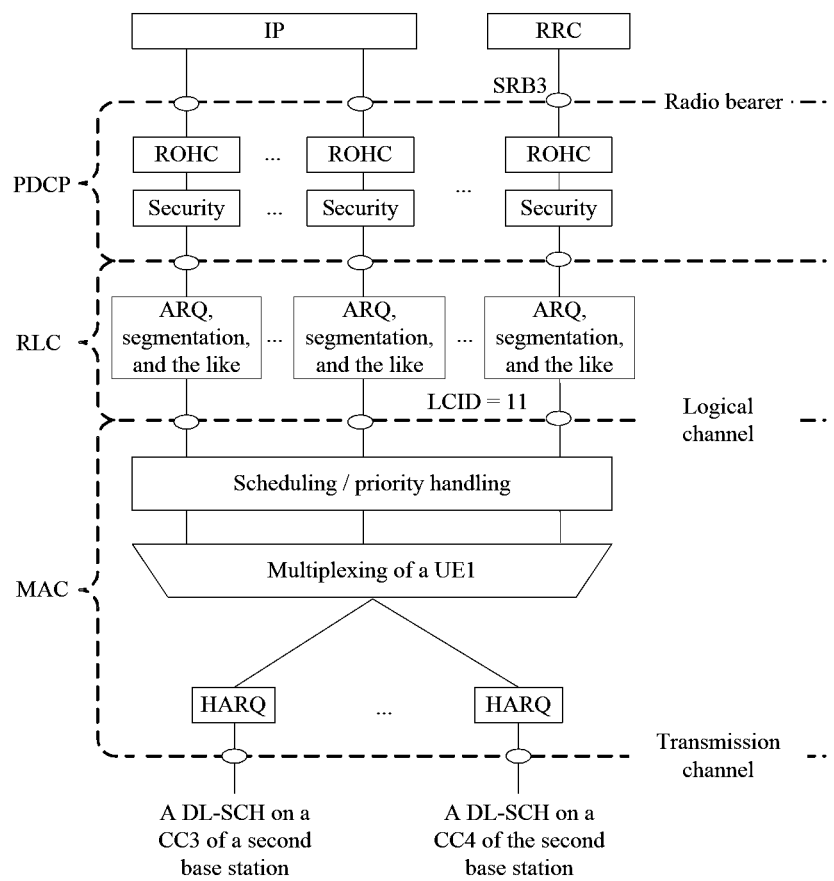
FIG. 2C is a schematic diagram of downlink mapping logic of a first base station according to an embodiment of the present invention.
Figure 2D:
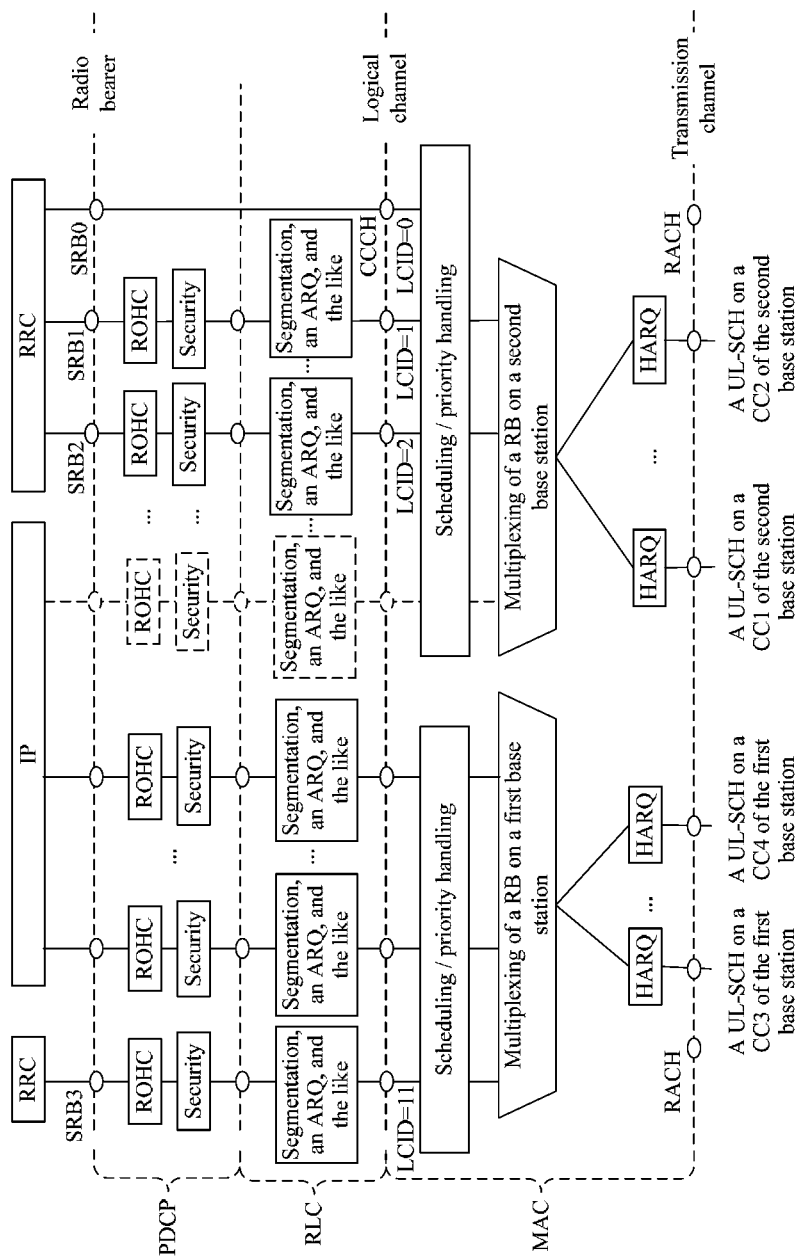
FIG. 2D is a schematic diagram of uplink mapping logic of an air interface from a perspective of a UE according to an embodiment of the present invention.

Downlink mapping logic of the first base station 31 is shown in FIG. 2C. On the first base station 31, on the downlink, the biggest difference between the first base station 31 and the base station in the current LTE system lies in that: the first base station 31 does not have a control-plane SRB0, SRB1, SRB2, broadcast channel, and paging channel of a UE. In addition, the first base station 31 has a user-plane DRB, which is used to perform user data transmission, of the UE, one module only used to configure a radio resource of an air interface connection between the first base station 31 and the UE, and one corresponding first signaling radio bearer. From a perspective of the UE, uplink mapping logic of an air interface is shown in FIG. 2D. FIG. 2D includes both uplink mapping logic of the first base station 31 and uplink mapping logic of the second base station 32.

It should be noted herein that, in FIG. 2C and FIG. 2D, the first signaling radio bearer is indicated by an SRB3, to which it is not limited.

On the UE, in the uplink, all conventional RRC connection functions (by using an SRB0, SRB1, or SRB2) of the UE are on the second base station 32; however, a function used for configuring an air interface connection between the UE and the first base station 31 (by using a first signaling radio bearer) is on the first base station 31. Different DRBs of the UE are separately connected to the first base station 31 and the second base station 32.

Both the first base station 31 and the second base station 32 have a random access channel (RACH) used for random access by the UE.

In conclusion, in a communications system or a network architecture in this embodiment, a first base station is responsible for performing user data transmission with a UE by using a DRB, and configuring a radio resource of an air interface connection between the base station and the UE by using a first signaling radio bearer. A second base station is responsible for performing signaling interaction with the UE, establishing, modifying, and releasing an RRC connection, performing UE mobility management, and the like, and controlling the UE to establish the first signaling radio bearer with the first base station. The second base station is not required for configuring the radio resource of the air interface connection between the first base station and the UE, and the first base station directly sends a configuration message to the UE by using the first signaling radio bearer, so that the UE configures the radio resource of the air interface connection between the UE and the first base station according to the configuration message, which reduces a delay in configuring the radio resource of the air interface connection between the UE and the first base station, saves an overhead of the second base station, and reduces complexity of the second base station.

Figure 2E:
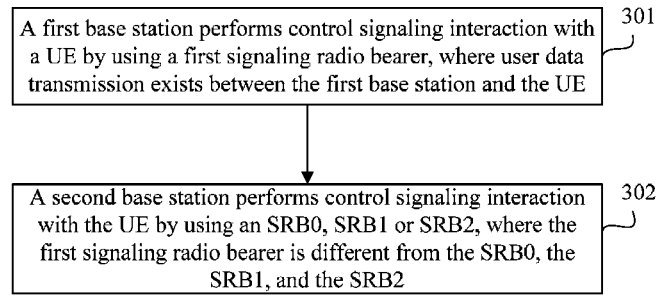
FIG. 2E is a flowchart of a signaling transmission method according to an embodiment of the present invention.

Based on the foregoing communications system, an embodiment of the present invention provides a signaling transmission method. As shown in FIG. 2E, the signaling transmission method specifically includes the following steps:

Step 301: A first base station performs control signaling interaction with a UE by using a first signaling radio bearer, where user data transmission exists between the first base station and the UE.

Step 302: A second base station performs control signaling interaction with the UE by using an SRB0, SRB1, or SRB2, where the first signaling radio bearer is different from the SRB0, the SRB1, and the SRB2.

That a first base station performs control signaling interaction with a UE by using a first signaling radio bearer mainly aims to configure a radio resource of an air interface connection between the first base station and the UE. That a second base station performs control signaling interaction with the UE by using an SRB0, SRB1, or SRB2 mainly includes: establishing, modifying, and releasing an RRC connection, performing UE mobility management, and the like, and is different from a process of performing control signaling interaction with the UE by the first base station by using the first signaling radio bearer.

It should be noted herein that, in the foregoing signaling transmission method, a sequence of performing control signaling transmission with the UE separately by the first base station and the second base station is not limited.

For a specific procedure of the signaling transmission method provided in this embodiment, reference may be made to the description of the communications system in the foregoing embodiment, and details are not repeatedly described herein.

In this embodiment, the first base station that performs user data transmission with the UE configures the radio resource of the air interface connection between the first base station and the UE by using the first signaling radio bearer different from an existing signaling radio bearer, so that the first base station and the UE may dynamically configure the radio resource of the air interface connection between the first base station and the UE in a timely and effective manner according to a change of a radio channel between the first base station and the UE; and the second base station is responsible for performing control signaling interaction with the UE, establishing, modifying, and releasing an RRC connection, performing UE mobility management, and the like. Further, the second base station is not required for configuring the radio resource of the air interface connection between the first base station and the UE, and the first base station directly sends a configuration message to the UE by using the first signaling radio bearer, so that the UE configures the radio resource of the air interface connection between the UE and the first base station according to the configuration message, which reduces a delay for the radio resource configuration of the air interface connection between the UE and the first base station, saves an overhead of the second base station, and reduces complexity of the second base station.

An embodiment of the present invention provides a base station, and user data transmission exists between the base station in this embodiment and a UE, where the base station in this embodiment performs control signaling interaction with the UE by using a first signaling radio bearer. The first signaling radio bearer is different from an SRB0, an SRB1 and an SRB2, and any signaling radio bearer of the SRB0, SRB1, and SRB2 is a signaling radio bearer that is used when another base station different from the base station in this embodiment performs control signaling interaction with the foregoing UE.

It can be seen from the foregoing that the base station in this embodiment may be an enhancement-layer base station in the embodiment shown in FIG. 1, or may be the first base station in the embodiment shown in FIG. 2A to FIG. 2D.

Figure 3A:
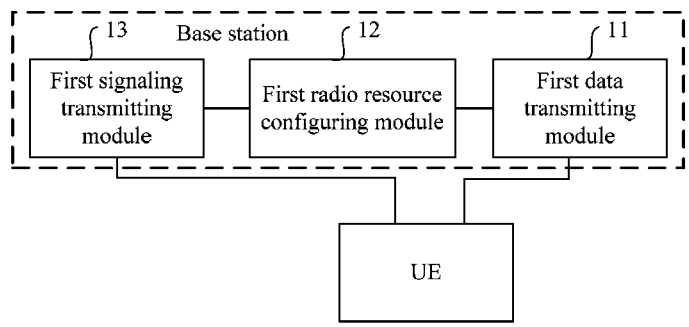
FIG. 3A is a schematic structural diagram of a base station according to an embodiment of the present invention.

In an optional implementation manner of this embodiment, as shown in FIG. 3A, the base station in this embodiment includes: a first radio resource configuring module 12 and a first signaling transmitting module 13.

The first radio resource configuring module 12 is configured to configure a radio resource of an air interface connection between the base station in this embodiment and a UE, and generate a configuration message. The configuration message includes radio resource configuration of the air interface connection.

The first signaling transmitting module 13 is connected to the first radio resource configuring module 12 and the UE, and is configured to send, by using the first signaling radio bearer, the configuration message generated by the first radio resource configuring module 12 to the UE, so that the UE configures the radio resource of the air interface connection between the UE and the base station in this embodiment according to the radio resource configuration of the air interface connection in the configuration message.

The base station in this embodiment does not include the SRB0, SRB1, and SRB2.

Based on the foregoing description, it can be seen that the base station in this embodiment is mainly responsible for DRB data transmission with the UE, is not responsible for establishing, modifying, and releasing an RRC connection of the UE, also does not perform UE mobility management, and belongs to an enhancement-layer base station. However, the base station in this embodiment includes the first signaling radio bearer, and may perform control signaling interaction with the UE by using the first signaling radio bearer, so as to control the UE to configure the radio resource of the air interface connection between the UE and the base station in this embodiment.

In an optional implementation manner of this embodiment, as shown in FIG. 3A, the base station in this embodiment further includes a first data transmitting module 11. The first data transmitting module 11 is connected to the first radio resource configuring module 12 and the UE, and is configured to use the radio resource that is of the air interface connection and configured by the first radio resource configuring module 12, to perform data transmission with the UE by using a DRB.

In an optional implementation manner of this embodiment, the first signaling transmitting module 13 is further configured to receive, by using the first signaling radio bearer, a configuration completion message sent by the UE, and send the configuration completion message to the first radio resource configuring module 12. Specifically, after receiving the configuration message, the UE configures the radio resource of the air interface connection according to the radio resource configuration of the air interface connection in the configuration message; generates the configuration completion message after configuring the radio resource of the air interface connection; and sends the configuration completion message to the base station in this embodiment by using the first signaling radio bearer, so as to inform the base station in this embodiment that the radio resource of the air interface connection has been configured. The base station in this embodiment receives, by using the first signaling radio bearer, the configuration completion message sent by the UE.

Correspondingly, the first radio resource configuring module 12 is further configured to receive the configuration completion message sent by the first signaling transmitting module 13.

In an optional implementation manner of this embodiment, the first signaling transmitting module 13 is specifically configured to receive, from a logical channel that is identified by a logical channel identifier (LCID) associated with the first signaling radio bearer, the configuration completion message sent by the UE, perform RLC sublayer and PDCP sublayer processing on the configuration completion message, and send a processed configuration completion message to the first radio resource configuring module 12.

In an LTE system, an RB (regardless of an SRB or a DRB) is in one-to-one correspondence with a logical channel, and each logical channel has a unique LCID. For example, in the LTE system, LCIDs associated with the SRB0, SRB1, and SRB2 are always 0, 1, and 2, while an LCID associated with another DRB is allocated to the UE by the base station by using RRC signaling. In this embodiment, the first signaling radio bearer of the base station in this embodiment also corresponds to a logical channel, and is associated with an LCID of the logical channel.

A length of the LCID is 5 bits. For the downlink, a binary value 01011 to a binary value 11010 are reserved values; for the uplink, binary values 01011 to 11000 are reserved values. There is a logical channel corresponding to the first signaling radio bearer on both the uplink and the downlink, and therefore, in an optional manner of the embodiment, LCIDs of uplink and downlink logical channels associated with the first signaling radio bearer are a same value, where the value is a value within a range from a binary value 01011 to a binary value 11000, for example, 01011, namely, 11 in decimal.

In an optional implementation manner of this embodiment, the first signaling transmitting module 13 is specifically configured to acquire, from the first radio resource configuring module 12, the configuration message generated by the first radio resource configuring module 12, perform PDCP sublayer and RLC sublayer processing on the configuration message, map a processed configuration message to the logical channel that is identified by the LCID associated with the first signaling radio bearer, and send the processed configuration message to the UE.

It should be noted herein that the first signaling transmitting module 13 maps a processed configuration message to the logical channel that is identified by the LCID associated with the first signaling radio bearer, and sends the processed configuration message to the UE includes that: first, the processed configuration message is mapped to the logical channel that is identified by the LCID associated with the first signaling radio bearer, and sent to a MAC sublayer of the base station in this embodiment, and then, the processed configuration message is sent by the MAC sublayer to a physical layer (Physical, PHY) and finally sent to the UE by using an air interface.

Optionally, the radio resource configuration of the air interface connection between the base station in this embodiment and the UE may include at least one piece of the following information: a MAC sublayer parameter between the UE and the base station in this embodiment, a PHY layer parameter between the UE and the base station in this embodiment, a DRB parameter between the UE and the base station in this embodiment, and a semi-persistent scheduling (SPS) parameter between the UE and the base station in this embodiment, to which it is not limited.

An example is used for description: in a case in which the base station in this embodiment needs to modify a maximum number of HARQ retransmission times for uplink data transmission, the air interface connection between the base station in this embodiment and the UE includes a MAC sublayer parameter. The MAC sublayer parameter is the same as information in an RRC connection reconfiguration message that is sent to a UE when a base station in the prior art modifies the MAC sublayer parameter, and details are not described herein again.

In a case in which the base station in this embodiment needs to modify a physical uplink control channel (PUCCH) parameter of the UE, the air interface connection between the base station in this embodiment and the UE includes a PHY layer parameter.

In a case in which the base station in this embodiment needs to modify both the MAC sublayer parameter and the PHY layer parameter of the UE, the air interface connection between the base station in this embodiment and the UE includes the MAC sublayer parameter and the PHY layer parameter.

In a case in which the base station in this embodiment needs to modify a DRB parameter transmitted by the base station in this embodiment, the air interface connection between the base station in this embodiment and the UE includes the DRB parameter between the UE and the base station in this embodiment.

In a case in which the DRB transmitted by the base station in this embodiment is in a semi-persistent scheduling state, and when the base station needs to modify semi-persistent scheduling configuration, the air interface connection between the base station in this embodiment and the UE includes an SPS parameter between the base station in this embodiment and the UE.

It can be seen from the foregoing that the base station in this embodiment includes the DRB, and mainly performs user data transmission with the UE by using the DRB. In addition, the base station in this embodiment further includes the first signaling radio bearer but not includes the SRB0, SRB1, and SRB2. After the radio resource of the air interface connection between the base station and the UE is configured, the configuration message is generated, and the configuration message is sent to the UE by using the first signaling radio bearer different from an existing signaling radio bearer, so that the UE configures the radio resource of the air interface connection according to the radio resource configuration of the air interface connection in the configuration message, and the base station in this embodiment and the UE may dynamically configure the radio resource of the air interface connection between the base station in this embodiment and the UE in a timely and effective manner according to a change of a radio channel between the base station in this embodiment and the UE, thereby solving a problem of configuring the radio resource of the air interface connection between the base station in this embodiment and the UE.

Further, the base station in this embodiment sends the radio resource configuration of the air interface connection between the base station and the UE to the UE by using the first signaling radio bearer, so as to configure the radio resource of the air interface connection between the base station in this embodiment and the UE, so that the radio resource configuration of the air interface connection between the base station in this embodiment and the UE is no longer delivered to the UE by using a base-layer base station, which reduces a delay in configuring the radio resource of the air interface connection between the base station in this embodiment and the UE, and also helps to save an overhead of the base-layer base station.

Based on the base station in the foregoing embodiment, another embodiment of the present invention provides a signaling transmission method, and the signaling transmission method specifically includes: performing, by the base station, control signaling interaction with a UE by using a first signaling radio bearer. User data transmission exists between the base station and the UE; the first signaling radio bearer is different from the SRB0, the SRB1, and the SRB2; and any signaling radio bearer of the SRB0, SRB1, and SRB2 is a signaling radio bearer that is used when another base station different from the base station performs control signaling interaction with the UE.

Figure 3B:
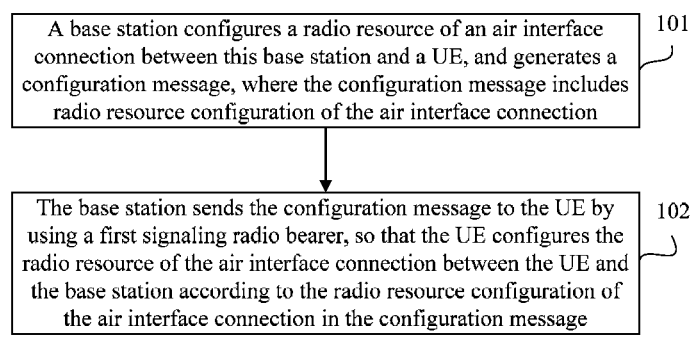
FIG. 3B is a flowchart of a signaling transmission method according to another embodiment of the present invention.

In an optional implementation manner of this embodiment, as shown in FIG. 3B, an implementation manner of performing control signaling interaction with the UE by the base station by using the first signaling radio bearer includes:

Step 101: A base station configures a radio resource of an air interface connection between the base station and a UE, and generates a configuration message, where the configuration message includes radio resource configuration of the air interface connection.

Step 102: The base station sends the configuration message to the UE by using a first signaling radio bearer, so that the UE configures the radio resource of the air interface connection between the UE and the base station according to the radio resource configuration of the air interface connection in the configuration message.

The base station in this embodiment is the base station provided in the embodiment shown in FIG. 3A, and includes a first signaling radio bearer and a DRB, and does not include an SRB0, an SRB1, and an SRB2, either. The base station in this embodiment belongs to an enhancement-layer base station, is responsible for providing user data transmission for the UE, and further has a function of performing control signaling interaction with the UE, where the control signaling interaction is mainly used to configure the radio resource of the air interface connection between the base station in this embodiment and the UE.

In an optional implementation manner of this embodiment, the method in this embodiment further includes: performing, by the base station, data transmission with the UE by using the DRB. Further, the base station specifically uses the radio resource that is of the air interface connection and configured by the base station to perform user data transmission with the UE by using the DRB.

An optional implementation manner of step 102 includes: The base station performs PDCP sublayer and RLC sublayer processing on the configuration message, maps a processed configuration message to a logical channel that is identified by an LCID associated with the first signaling radio bearer, and sends the processed configuration message to the UE.

Optionally, the radio resource configuration of the air interface connection between the base station in this embodiment and the UE may include at least one piece of the following information: a MAC sublayer parameter between the UE and the base station in this embodiment, a PHY layer parameter between the UE and the base station in this embodiment, a DRB between the UE and the base station in this embodiment, and an SPS parameter between the UE and the base station in this embodiment, to which it is not limited.

Optionally, the LCID associated with the first signaling radio bearer of the base station in this embodiment is a value within a range from a binary value 01011 to a binary value 11000, for example, 01011 is 11 in decimal.

It can be seen from the foregoing that, in this embodiment, user data transmission exists between the base station and the UE, the base station performs data transmission with the UE by using the DRB, and performs control signaling interaction with the UE by using the first signaling radio bearer, so that the base station and the UE may dynamically configure the radio resource of the air interface connection between the base station and the UE in a timely and effective manner according to a change of a radio channel between the base station and the UE, thereby solving a problem of configuring the radio resource of the air interface connection between the base station in this embodiment and the UE.

Further, in the method in this embodiment, the radio resource configuration of the air interface connection between the enhancement-layer base station and the UE does not need to be delivered by using a base-layer base station, which reduces a delay in configuring the radio resource of the air interface connection between the enhancement-layer base station and the UE, and also helps to save an overhead of the base-layer base station.

Figure 3C:
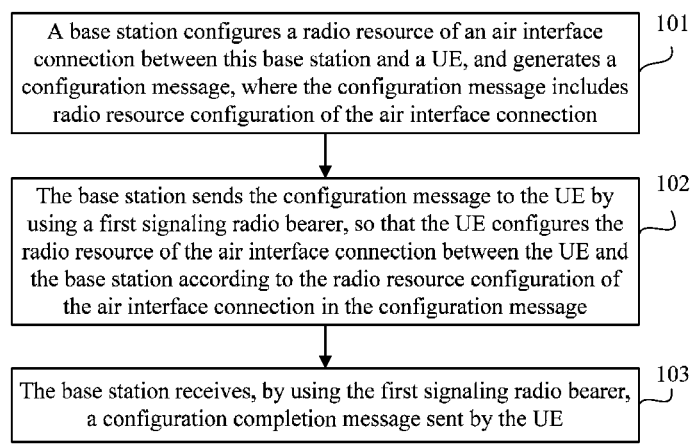
FIG. 3C is a flowchart of a signaling transmission method according to still another embodiment of the present invention.

In an optional implementation manner of this embodiment, as shown in FIG. 3C, after step 102, the method in this embodiment includes:

Step 103: The base station receives, by using the first signaling radio bearer, a configuration completion message sent by the UE.

An optional implementation manner of step 103 includes: The base station receives, from the logical channel that is identified by the LCID associated with the first signaling radio bearer, the configuration completion message sent by the UE. Then, the base station performs RLC sublayer and PDCP sublayer processing on the configuration completion message, and learns, according to a processed configuration completion message, that the UE has configured the radio resource of the air interface connection.

In this embodiment, after configuring the radio resource of the air interface connection, the UE sends the configuration completion message to the base station in this embodiment; and the base station in this embodiment receives the configuration completion message by using the first signaling radio bearer, and learns, according to the configuration completion message, that the UE has configured the radio resource of the air interface connection. If the base station does not receive the configuration completion message sent by the UE, it may be determined that the UE does not configure the radio resource of the air interface connection successfully, and a configuration message may be sent to the UE again in a timely manner, which helps to improve a success rate of configuring a radio resource of an air interface connection.

An embodiment of the present invention provides a UE, and user data transmission exists between the UE in this embodiment and a base station, where the UE in this embodiment performs control signaling interaction with the base station by using a first signaling radio bearer. The first signaling radio bearer is different from an SRB0, an SRB1, and an SRB2, and any signaling radio bearer of the SRB0, SRB1, and SRB2 is a signaling radio bearer that is used when another base station different from the base station performs control signaling interaction with the UE in this embodiment. Optionally, the first signaling radio bearer is a newly defined signaling radio bearer, for example, the first signaling radio bearer may be marked as an SRB3, to which it is not limited.

The base station that performs control signaling interaction with the UE in this embodiment by using the first signaling radio bearer belongs to an enhancement-layer base station, where the enhancement-layer base station has a function of performing data transmission with the UE by using a DRB, and a function of performing control signaling interaction with the UE in this embodiment. The control signaling interaction herein is mainly used to control the UE in this embodiment to configure a radio resource of an air interface connection between the base station and the UE in this embodiment. The base station may be the first base station in the embodiment shown in FIG. 2A to FIG. 2D. The another base station different from the base station mainly refers to a base-layer base station and includes the SRB0, SRB1, and SRB2.

Figure 4A:
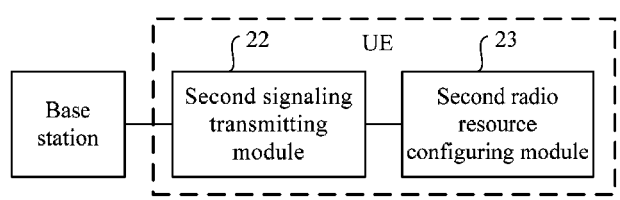
FIG. 4A is a schematic structural diagram of a UE according to an embodiment of the present invention.

In an optional implementation manner of this embodiment, as shown in FIG. 4A, the UE in this embodiment includes: a second signaling transmitting module 22 and a second radio resource configuring module 23.

The second signaling transmitting module 22 is connected to the base station and configured to receive, by using the first signaling radio bearer, a configuration message sent by the base station, where the configuration message includes radio resource configuration of the air interface connection between the base station and the UE. The base station also sends the configuration message to the UE in this embodiment by using the first signaling radio bearer.

The second radio resource configuring module 23 is connected to the second signaling transmitting module 22 and configured to configure the radio resource of the air interface connection according to the radio resource configuration of the air interface connection in the configuration message received by the second signaling transmitting module 22.

Figure 4B:
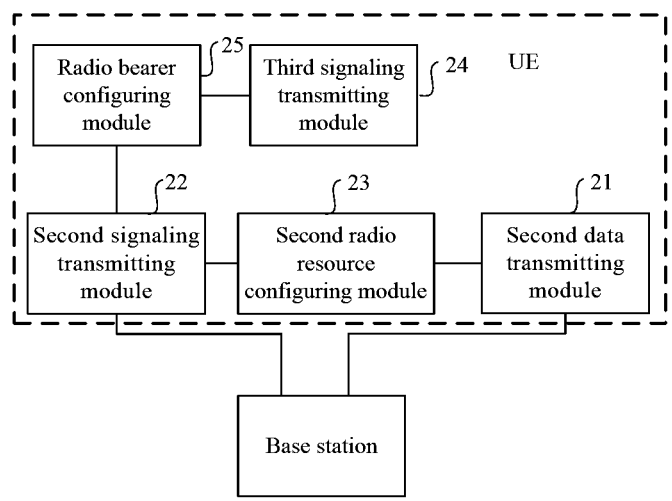
FIG. 4B is a schematic structural diagram of a UE according to another embodiment of the present invention.

In an optional implementation manner of this embodiment, as shown in FIG. 4B, the UE in this embodiment further includes a second data transmitting module 21. The second data transmitting module 21 is configured to perform data transmission with the base station by using a DRB. Optionally, the second data transmitting module 21 is connected to the second radio resource configuring module 23, and is configured to use the radio resource that is of the air interface connection and configured by the second radio resource configuring module 23, to perform data transmission with the base station by using the DRB.

In an optional implementation manner of this embodiment, the second radio resource configuring module 23 is further configured to generate a configuration completion message after configuring the air interface connection. Correspondingly, the second signaling transmitting module 22 in this embodiment is further configured to send the configuration completion message to the base station by using the first signaling radio bearer.

In an optional implementation manner of this embodiment, the second signaling transmitting module 22 may be specifically configured to acquire, from the second radio resource configuring module 23, the configuration completion message generated by the second radio resource configuring module 23, perform PDCP sublayer and RLC sublayer processing on the configuration completion message, map a processed configuration completion message to a logical channel that is identified by an LCID associated with the first signaling radio bearer, and send the processed configuration completion message to the base station.

In an optional implementation manner of this embodiment, the second signaling transmission module 22 may be specifically configured to receive, from the logical channel that is identified by the LCID associated with the first signaling radio bearer, the configuration message sent by the base station, perform RLC sublayer and PDCP sublayer processing on the configuration message, and send a processed configuration message to the second radio resource configuring module 23.

Optionally, the radio resource configuration of the air interface connection between the UE in this embodiment and the base station may include at least one piece of the following information: a MAC sublayer parameter between the UE in this embodiment and the base station, a PHY layer parameter between the UE in this embodiment and the base station, a DRB between the UE in this embodiment and the base station, and an SPS parameter between the UE in this embodiment and the base station, to which it is not limited. For an example that the radio resource configuration of the air interface connection includes what kind of information in which situation, reference may be made to the description of the embodiment shown in FIG. 3A.

In an optional implementation manner of this embodiment, the LCID associated with the first signaling radio bearer is a value within a range from a binary value 01011 to a binary value 11000, which, for example, may be 01011, namely, 11 in decimal.

In an optional implementation manner of this embodiment, as shown in FIG. 4B, the UE in this embodiment further includes: a third signaling transmitting module 24 and a radio bearer configuring module 25. The third signaling transmitting module 24 is configured to receive, by using the SRB1, an RRC message that is sent by another base station different from the base station, where the RRC message includes an identifier and configuration information of the first signaling radio bearer. The radio bearer configuring module 25 is connected to the third signaling transmitting module 24 and configured to locally configure the first signaling radio bearer according to the RRC message received by the third signaling transmitting module 24. Optionally, the radio bearer configuring module 25 is further connected to the second signaling transmitting module 22 and configured to provide the first signaling radio bearer for the second signaling transmitting module 22. The foregoing RRC message may be an RRC connection reconfiguration message, to which it is not limited. The configuration information in the foregoing RRC message includes RLC configuration, a logical channel identifier, logical channel configuration, and the like.

That is, the first signaling radio bearer on the UE in this embodiment is newly added by the UE according to the RRC connection reconfiguration message that is sent by a base-layer base station (namely, another base station different from the base station) to which the UE gains access. For example, it is assumed that an identifier of the newly added first signaling radio bearer is 3, and then the newly added first signaling radio bearer is an SRB3.

It should be noted herein that, in addition to the first signaling radio bearer and the DRB, the UE in this embodiment further includes the SRB0, SRB1, and SRB2. That is, in addition to functions implemented by the foregoing function modules, the UE in this embodiment further has an RRC connection function of the UE in the prior art, where this function is implemented on the base-layer base station to which the UE gains access. In addition, a different DRB of the UE in this embodiment may be separately on the base-layer base station and the base station (namely, the enhancement-layer base station) in this embodiment.

It can be seen from the foregoing that the UE in this embodiment receives, by using the first signaling radio bearer different from an existing signaling radio bearer, the configuration message that is sent by the enhancement-layer base station by using the first signaling radio bearer, configures the radio resource of the air interface connection between the UE and the enhancement-layer base station according to the radio resource configuration of the air interface connection in the configuration message, so that the UE in this embodiment and the enhancement-layer base station may dynamically configure the radio resource of the air interface connection between the UE in this embodiment and the enhancement-layer base station in a timely and effective manner according to a change of a radio channel between the UE in this embodiment and the enhancement-layer base station, thereby solving a problem of configuring the radio resource of the air interface connection between the UE in this embodiment and the enhancement-layer base station.

Further, the UE in this embodiment receives, by using the first signaling radio bearer different from an existing signaling radio bearer, the radio resource configuration of the air interface connection that is delivered by the enhancement-layer base station by using the first signaling radio bearer, and configures the radio resource of the air interface connection between the UE in this embodiment and the enhancement-layer base station, so that the radio resource configuration of the air interface connection between the enhancement-layer base station and the UE does not need to be delivered by using the base-layer base station, which reduces a delay in configuring the radio resource of the air interface connection between the enhancement-layer base station and the UE in this embodiment, and also helps to save an overhead of the base-layer base station.

Based on the UE provided in the foregoing embodiment, still another embodiment of the present invention provides a signaling transmission method, and the signaling transmission method specifically includes: performing, by the UE, control signaling interaction with a base station by using a first signaling radio bearer. User data transmission exists between the UE and the base station; the first signaling radio bearer is different from an SRB0, an SRB1 and an SRB2; and any signaling radio bearer of the SRB0, SRB1, and SRB2 is a signaling radio bearer that is used when another base station different from the base station performs control signaling interaction with the UE in this embodiment.

The base station that performs control signaling interaction with the UE in this embodiment by using the first signaling radio bearer belongs to an enhancement-layer base station, where the enhancement-layer base station has a function of performing data transmission with the UE by using a DRB, and a function of performing control signaling interaction with the UE in this embodiment. The control signaling interaction herein is mainly used to control the UE in this embodiment to configure a radio resource of an air interface connection between the base station and the UE in this embodiment. The base station may be the first base station in the embodiment shown in FIG. 2A to FIG. 2D. The another base station different from the base station mainly refers to a base-layer base station and includes the SRB0, SRB1, and SRB2.

Figure 4C:
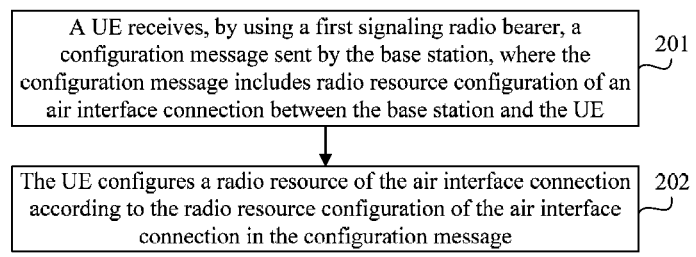
FIG. 4C is a flowchart of a signaling transmission method according to still another embodiment of the present invention.

In an optional implementation manner of this embodiment, as shown in FIG. 4C, an implementation manner of performing control signaling interaction with the base station by the UE by using the first signaling radio bearer includes the following steps:

Step 201: A UE receives, by using a first signaling radio bearer, a configuration message sent by the base station, where the configuration message includes radio resource configuration of an air interface connection between the base station and the UE. The base station also sends the configuration message to the UE by using the first signaling radio bearer.

Step 202: The UE configures a radio resource of the air interface connection according to the radio resource configuration of the air interface connection in the configuration message.

In an optional implementation manner of this embodiment, the method in this embodiment further includes: performing, by the UE, data transmission with the base station by using the DRB. Specifically, the UE uses the radio resource that is of the air interface connection and configured by the UE, to perform data transmission with the base station by using the DRB.

An optional implementation manner of step 201 includes: The UE receives, from a logical channel that is identified by an LCID associated with the first signaling radio bearer, the configuration message sent by the base station. Then, the UE performs RLC sublayer and PDCP sublayer processing on the configuration message.

Based on the foregoing description, step 202 is specifically: The UE acquires the radio resource configuration of the air interface connection from a processed configuration message, and then configures the radio resource of the air interface connection according to the acquired radio resource configuration of the air interface connection.

Optionally, the air interface connection between the UE in this embodiment and the base station may include at least one piece of the following information: a MAC sublayer parameter between the UE in this embodiment and the base station, a PHY layer parameter between the UE in this embodiment and the base station, a DRB between the UE in this embodiment and the base station, and an SPS parameter between the UE in this embodiment and the base station, to which it is not limited.

In an optional implementation manner of this embodiment, the LCID associated with the first signaling radio bearer is a value within a range from a binary value 01011 to a binary value 11000, which, for example, may be 01011, namely, 11 in decimal.

It can be seen from the foregoing that, in this embodiment, the UE receives the configuration message that is sent by the enhancement-layer base station by using the first signaling radio bearer different from an existing signaling radio bearer, and configures the radio resource of the air interface connection between the UE and the enhancement-layer base station according to the radio resource configuration of the air interface connection in the configuration message, thereby solving a problem of configuring the radio resource of the air interface connection between the UE and the enhancement-layer base station.

Further, in the method in this embodiment, the UE receives, by using the first signaling radio bearer different from an existing signaling radio bearer, the radio resource configuration of the air interface connection that is delivered by the enhancement-layer base station by using the first signaling radio bearer, and configures the radio resource of the air interface connection, so that the radio resource configuration of the air interface connection between the enhancement-layer base station and the UE does not need to be delivered by using the base-layer base station, which reduces a delay in configuring the radio resource of the air interface connection between the enhancement-layer base station and the UE, and also helps to save an overhead of the base-layer base station.

Figure 4D:
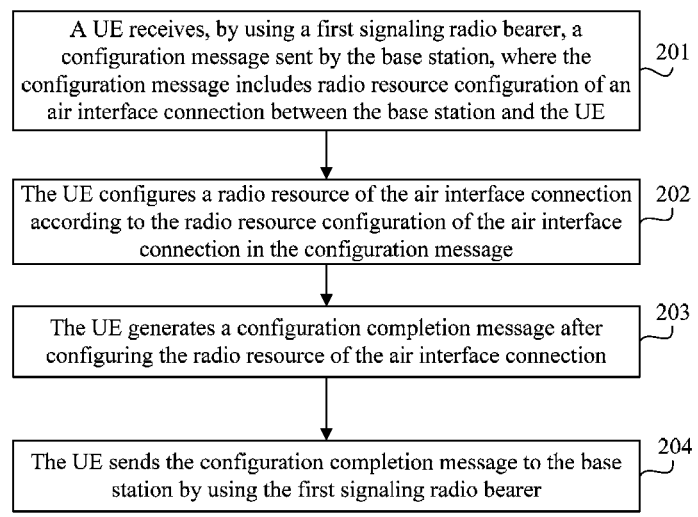
FIG. 4D is a flowchart of a signaling transmission method according to still another embodiment of the present invention.

FIG. 4D is a flowchart of a signaling transmission method according to still another embodiment of the present invention. This embodiment is implemented based on the embodiment shown in FIG. 4C. As shown in FIG. 4D, after step 202, the method in this embodiment further includes the following steps:

Step 203: The UE generates a configuration completion message after configuring the radio resource of the air interface connection.

Step 204: The UE sends the configuration completion message to the base station by using the first signaling radio bearer.

An optional implementation manner of step 204 includes: The UE performs PDCP sublayer and RLC sublayer processing on the configuration completion message, maps a processed configuration completion message to the logical channel that is identified by the LCID associated with the first signaling radio bearer, and sends the processed configuration completion message to the base station.

In this embodiment, after configuring of an air interface connection, a UE sends a configuration completion message to a base station in this embodiment; and the base station in this embodiment receives the configuration completion message by using a first signaling radio bearer, and learns, according to the configuration completion message, that the UE has configured a radio resource of the air interface connection. If the base station in this embodiment does not receive the configuration completion message sent by the UE, it may be determined that the UE does not configure the radio resource of the air interface connection successfully, and a configuration message may be sent to the UE again in a timely manner, which helps to improve a success rate of configuring a radio resource of an air interface connection.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communications system, comprising:
    a first base station and a second base station that control signaling interactions with a user equipment (UE);
    the first base station is configured to:
        generate a configuration message;
        process the configuration message at Packet Data Convergence Protocol (PDCP) and radio link control (RLC) sublayers;
        map the processed configuration message to a logical channel identified by a logical channel identifier (LCID) associated with a first signaling radio bearer; and
        send the processed configuration message to the UE so as to enable the UE to configure a radio resource of an air interface connection;
    the second base station is configured to control signaling interaction with the UE using a signaling radio bearer different from the first signaling radio bearer.

2. The communications system according to claim 1, wherein the second base station is configured to send a radio resource control (RRC) message to the UE using the SRB1, to enable the UE to add the first signaling radio bearer, wherein the RRC message comprises an identifier and configuration information of the first signaling radio bearer.

3. The communications system according to claim 1, wherein the first base station is configured to configure the radio resource of the air interface connection between the first base station and the UE; wherein the configuration message comprises the radio resource configuration of the air interface connection, the configuration message is sent to the UE using the first signaling radio bearer; and receive, a configuration completion message sent by the UE, using the first signaling radio bearer;
    wherein the radio resource of the air interface connections is configured based on a radio resource configuration of the air interface connection.

4. The communications system according to claim 3, wherein the first base station is further configured to use the radio resource that is of the air interface connection and configured by the first base station, to perform the user data transmission with the UE using a data radio bearer (DRB).

5. The communication system according to claim 1, wherein
    user data transmission exists between the first base station and the UE; and
    wherein the second base station performs the control signaling interaction with the UE using one of a signaling radio bearer SRB0, a signaling radio bearer SRB1, and a signaling radio bearer SRB2.

6. A base station, wherein user data transmission exists between the base station and a user equipment (UE), and the base station performs control signaling interaction with the UE using a first signaling radio bearer, the base station comprising:
    a radio resource configuring module configured to generate a configuration message;
    a signaling transmitting module configured to (a) process the configuration message at Packet Data Convergence Protocol (PDCP) and radio link control (RLC) sublayers, (b) map the processed configuration message to a logical channel identified by a logical channel identifier (LCID) associated with the first signaling radio bearer, and (c) send the processed configuration message to the UE so as to enable the UE to configure a radio resource of an air interface connection.

7. The base station according to claim 6, wherein:
    the first radio resource configuring module is further configured to configure the radio resource of the air interface connection between the base station and the UE, wherein the configuration message comprises the radio resource configuration of the air interface connection; and
    wherein the radio resource of the air interface connections is configured based on a radio resource configuration of the air interface connection.

8. The base station according to claim 7, further comprising:
    a first data transmitting module, configured to use the radio resource that is of the air interface connection and configured by the first radio resource configuring module, to perform to user data transmission with the UE using a data radio bearer (DRB).

9. The base station according to claim 7, wherein the first signaling transmitting module is further configured to receive, using the first signaling radio bearer, a configuration completion message sent by the UE, and send the configuration completion message to the first radio resource configuring module.

10. The base station according to claim 9, wherein the first signaling transmitting module is configured to receive, from the logical channel that is identified by the logical channel identifier (LCID) associated with the first signaling radio bearer, the configuration completion message sent by the UE, perform the radio link control (RLC) sublayer and the Packet Data Convergence Protocol (PDCP) sublayer processing on the configuration completion message, and send a processed configuration completion message to the first radio resource configuring module.

11. The base station according to claim 7, wherein the radio resource configuration of the air interface connection comprises at least one piece of the following information:
    a media access control (MAC) sublayer parameter between the UE and the base station, a physical (PHY) layer parameter between the UE and the base station, a data radio bearer (DRB) parameter between the UE and the base station, and a semi-persistent scheduling (SPS) parameter between the UE and the base station.

12. The base station according to claim 6, wherein the LCID associated with the first signaling radio bearer is a value within a range from a binary value 01011 to a binary value 11000.

13. The base station according to claim 6, wherein the first signaling radio bearer is different from a signaling radio bearer SRB0, a signaling radio bearer SRB1, and a signaling radio bearer SRB2; and any signaling radio bearer of the SRB0, SRB1, and SRB2 is a signaling radio bearer that is used when another base station different from the base station performs control signaling interaction with the UE.

14. A signaling transmission method at a base station providing control signaling interaction with a user equipment (UE) using a first signaling radio bearer, the method comprising:
    generating a configuration message;
    processing the configuration message at Packet Data Convergence Protocol (PDCP) and radio link control (RLC) sublayers;
    mapping the processed configuration message to a logical channel identified by a logical channel identifier (LCID) associated with the first signaling radio bearer; and sending the processed configuration message to the UE to enable the UE to configure a radio resource of an air interface connection.

15. The signaling transmission method according to claim 14, wherein performing the control signaling interaction with the UE comprises:
configuring, by the base station, the radio resource of the air interface connection between the base station and the UE, and wherein the configuration message comprises radio resource configuration of the air interface connection; and
wherein the radio resource of the air interface connections is configured based on a radio resource configuration of the air interface connection.

16. The signaling transmission method according to claim 15, further comprising:
receiving, by the base station using the first signaling radio bearer, a configuration completion message sent by the UE.

17. The signaling transmission method according to claim 16, wherein receiving the configuration completion message sent by the UE comprises:
receiving, by the base station from the logical channel that is identified by a logical channel identifier (LCID) associated with the first signaling radio bearer, the configuration completion message sent by the UE; and
performing, by the base station, the radio link control (RLC) sublayer and the Packet Data Convergence Protocol (PDCP) sublayer processing on the configuration completion message, so that the base station acknowledges, according to a processed configuration completion message, that the UE has configured the radio resource of the air interface connection.

18. The signaling transmission method according to claim 15, wherein the radio resource configuration of the air interface connection comprises at least one piece of the following information:
a media access control (MAC) sublayer parameter between the UE and the base station, a physical (PHY) layer parameter between the UE and the base station, a data radio bearer (DRB) parameter between the UE and the base station, and a semi-persistent scheduling (SPS) parameter between the UE and the base station.

19. The signaling transmission method according to claim 14, wherein the LCID associated with the first signaling radio bearer is a value within a range from a binary value 01011 to a binary value 11000.

20. The signaling transmission method according to claim 15, further comprising:
using, by the base station, the radio resource that is of the air interface connection and configured by the base station, to perform the user data transmission with the UE using a data radio bearer (DRB).

* * * * *